United States Patent [19]
Bortz, Jr.

[11] Patent Number: 6,030,560
[45] Date of Patent: Feb. 29, 2000

[54] METHOD FOR MAKING A CUSHIONED ARTICLE

[75] Inventor: Wayne E. Bortz, Jr., Wyomissing, Pa.

[73] Assignee: International Cushioned Products, Inc., Richmond, Canada

[21] Appl. No.: 08/925,560

[22] Filed: Sep. 8, 1997

[51] Int. Cl.⁷ .......................... B29C 44/06; B29C 44/12
[52] U.S. Cl. ................. 264/46.4; 264/46.5; 264/155; 264/255; 264/257; 264/338; 425/812
[58] Field of Search ............... 427/202; 264/309, 264/257, 255, 46.4, 46.5, 338, 155, 258; 425/812

[56] References Cited

U.S. PATENT DOCUMENTS

| | | | |
|---|---|---|---|
| 3,623,931 | 11/1971 | Van Hosen | 264/46.5 |
| 4,209,862 | 7/1980 | Cortes-Garza | 264/46.5 |
| 4,289,717 | 9/1981 | Bortz | 264/257 |
| 4,822,549 | 4/1989 | Verwilst | 264/309 |
| 4,938,825 | 7/1990 | Macdonald . | |
| 5,073,318 | 12/1991 | Rohrlach et al. | 264/255 |
| 5,082,609 | 1/1992 | Rohrlach et al. | 264/257 |
| 5,092,951 | 3/1992 | Popovich et al. . | |
| 5,119,518 | 6/1992 | Marsilio . | |
| 5,132,052 | 7/1992 | Cobbledick et al. | 264/255 |
| 5,329,649 | 7/1994 | Turek . | |
| 5,580,621 | 12/1996 | Kuszaj et al. . | |
| 5,662,996 | 9/1997 | Jourquin et al. | 264/309 |

FOREIGN PATENT DOCUMENTS

| | | | |
|---|---|---|---|
| 0 562 716 | 9/1993 | European Pat. Off. | 264/255 |
| 58-147325 | 9/1983 | Japan | 264/46.5 |
| 58-183234 | 10/1983 | Japan | 264/255 |

*Primary Examiner*—Allan R. Kuhns
*Attorney, Agent, or Firm*—Webb Ziesenheim Logsdon Orkin & Hanson, P.C.

[57] ABSTRACT

A method is provided for making a cushioned article. A base is formed in a female base mold. The base has a substantially smooth exterior and a substantially rough interior surface. A flexible skin is formed by applying at least one carrier solvent free material onto a form. The base and flexible skin are assembled such that a cavity is formed therebetween and a foam material is injected into the cavity such that when the foam material cures, the foam material unites the base with the flexible skin to form the article. A method is also provided for making a cushioned article in which a first carrier solvent free resin mixture is applied to a form to form a first coating, a second carrier solvent free resin mixture is applied to the first coating to form a second coating, a foamable polymeric resin is applied onto the second coating to form a third coating, a binder coating is applied to the third coating and a fiberglass coating is applied onto the binder coating to form the cushioned article.

19 Claims, 5 Drawing Sheets

METHOD FOR MAKING A CUSHIONED ARTICLE

BACKGROUND OF THE INVENTION

1. Field of the Invention

This invention relates generally to the production of cushioned articles and, more particularly, to a method of making a cushioned bathroom article having a laminar structure.

2. Description of the Prior Art

Cushioned bathroom articles such as bathtubs, shower stalls, sinks, etc. are known in the art. These articles are typically formed as a laminated structure having a flexible polymeric outer layer, typically of vinyl, a base, typically made of a fiberglass reinforced polyester resin, and a cellular foam sandwiched between the flexible polymeric outer layer and the base. Such cushioned bathroom articles are comparable in appearance to conventional steel, iron or porcelain coated bathroom articles. However, the foam provides improved thermal and acoustic insulation over such conventional fluid receptacles. Additionally, when such a laminar structure is applied in the formation of a bathtub, the combination of a flexible polymeric outer layer with a foam under layer reduces the likelihood of someone slipping in the tub and, in the event someone does slip, cushions the fall of a person in the tub.

For a number of reasons, such prior art cushioned bathroom articles have not found widespread acceptance. Perhaps the most important of these reasons is that the cushioned bathroom articles known in the prior art are not able to withstand the rigors of actual use over prolonged periods of time. Additionally, these cushioned bathroom articles typically cost substantially more than conventional, non-cushioned articles. The relatively greater cost for the cushioned articles is due to several reasons, including the increased costs and manufacturing time required for preparation and fabrication of the cushioned components and also the large number of rejects produced in the highly sensitive laminar manufacturing process.

An example of a prior art cushioned bathroom article is described in U.S. Pat. No. 4,289,717 to Bortz. The Bortz patent discloses a fabrication method in which a base is formed by a two-part mold resin injection process. A vinyl containing outer skin and a foam layer are combined with the base to form a cushioned tub. The Bortz patent is typical of the known manufacturing processes for producing cushioned articles. However, these known methods, such as the method disclosed in the Bortz patent, have several distinct disadvantages.

Firstly, the two-part mold resin injection process used to form the base of the tub is a costly and time-consuming process. The two part molds required for this process must be made to a high degree of tolerance and, therefore, are costly to purchase.

Additionally, the components used to form the flexible skin contain a volatile carrier solvent which must be volatilized after application. The curing of these volatile solvents has a tendency to form small, trapped bubbles in the skin which adversely impact upon the overall look and structural integrity of the finished article. Additionally, these volatile solvents are generally toxic and flammable and, therefore, the article under manufacture must be quarantined during evaporation of these solvents.

Further, the flexible composite outer polymeric skin includes vinyl. When vinyl is used as the outer skin, breakdown of this skin can occur under the rigors of actual use due to the physical properties of the flexible skin, such as tensile strength, elongation strength and abrasion resistance. Vinyl tends to lose plasticizer over time, resulting in a hardening of the flexible polymeric outer skin. The curing times required for vinyl resins also contribute significantly to the length of the processing time for the tub.

An additional reason that prior cushioned articles have not found widespread acceptance in the market is due to the problems encountered in the molding process. For example, the process described in the Bortz patent produces an unacceptably high number of rejects due to the leakage of foam between the base and the flexible composite skin during the manufacturing process.

Therefore, it is an object of the invention to provide a method of manufacturing a cushioned article in which the disadvantages of the solvent based coatings of the prior art are eliminated. It is a further object of the invention to provide a manufacturing method which decreases the number of rejects in the manufacturing process and also decreases the overall costs of the manufacturing process. It is also an object of the invention to provide an improved manufacturing process which reduces the length of time required to fabricate a cushioned article.

SUMMARY OF THE INVENTION

A method is provided for making a cushioned article. A base is formed in a female base mold. The base has a substantially smooth exterior and a substantially rough interior surface. A flexible skin is formed by applying at least one carrier solvent free material onto a form. The base and flexible skin are assembled such that a cavity is formed therebetween, and a foam material is injected into the cavity such that when the foam material cures, the foam material binds the base with the flexible skin to form the article.

A method is also provided for making a cushioned article in which a first carrier solvent free resin mixture is applied to a form to form a first coating, a second carrier solvent free resin mixture is applied to the first coating to form a second coating, a foamable polymeric resin is applied to the second coating to form a third coating, a binder coating is applied to the third coating and a fiberglass coating is applied to the binder coating to form the cushioned article.

A complete understanding of the invention will be obtained from the following description when taken in connection with the accompanying drawing figures wherein like reference characters identify like parts throughout.

DESCRIPTION OF THE PREFERRED EMBODIMENTS

Figure 1:
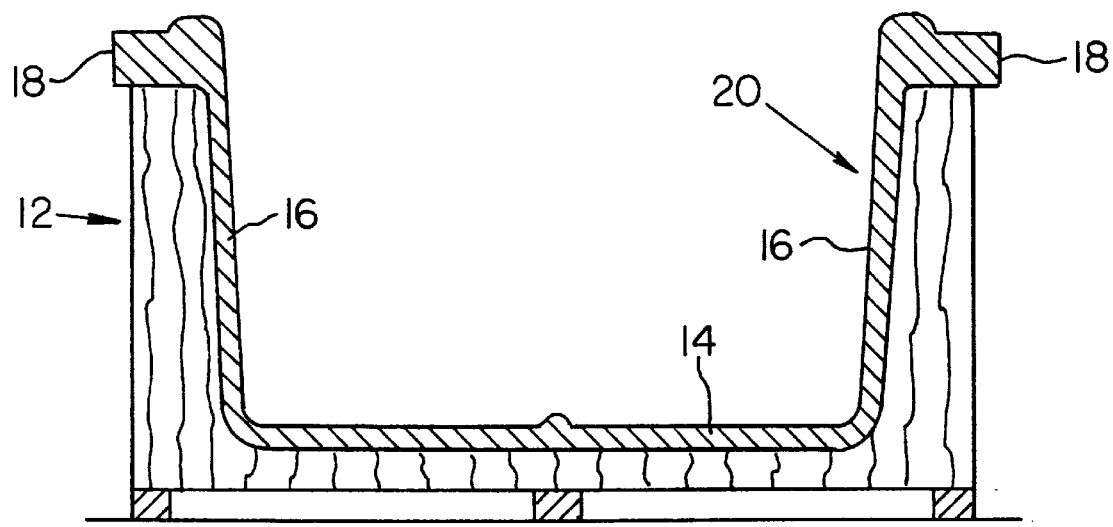
FIG. 1 is a cross-sectional view of a base mold.

For purposes of the description hereinafter, the terms "upper", "lower", "right", "left", "vertical", "horizontal", "top", "bottom" and derivatives thereof shall relate to the invention as it is oriented in the drawing figures. However, it is to be understood that the invention may assume various alternative variations and step sequences, except where expressly specified to the contrary. It is also to be understood that the specific devices and processes illustrated in the attached drawings, and described in the following specification, are simply exemplary embodiments of the invention. Hence, specific dimensions and other physical characteristics related to the embodiments disclosed herein are not to be considered as limiting.

For the purposes of the description of the fabrication method, the invention will be described with reference to the construction of a cushioned bathtub. However, it should be understood that the invention is not limited to bathtubs but is directed to the fabrication of cushioned articles in general, such as shower stalls, sinks, "whirlpool" tubs, hot tubs, spas, beauty salon sinks, swimming pools, X-ray table tops, etc.

Figure 2:
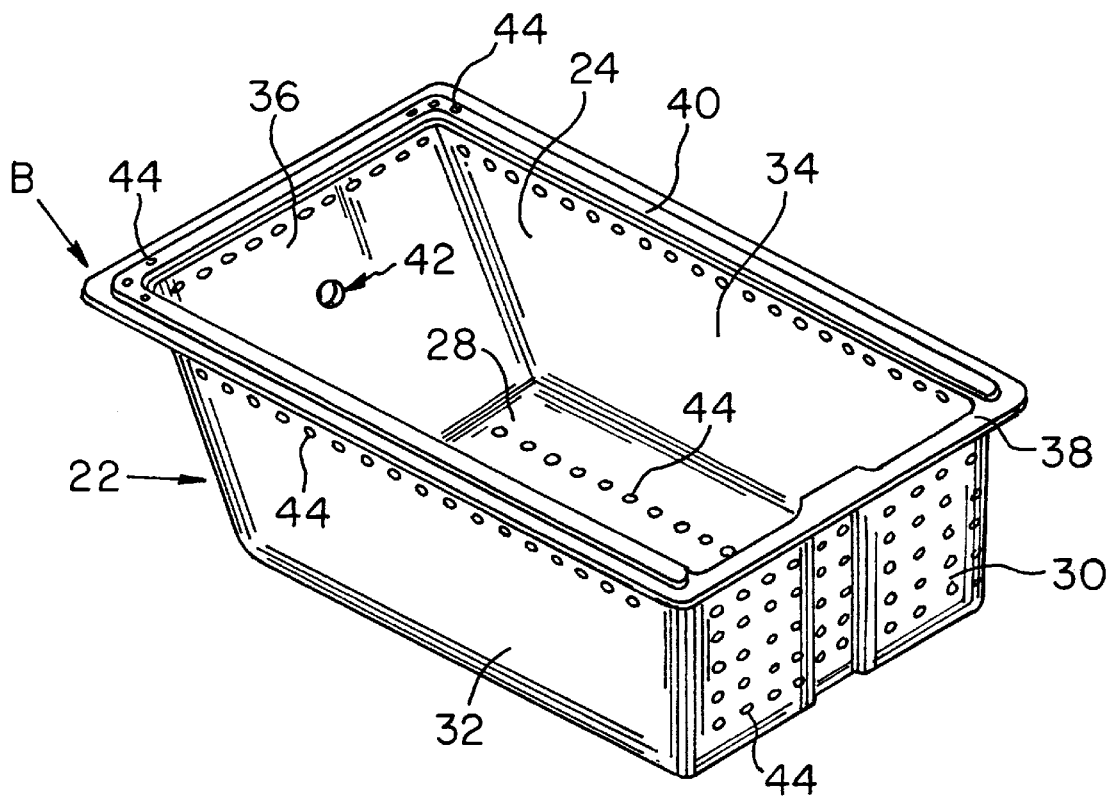
FIG. 2 is an elevational view of a base.

The first step in the fabrication process is the construction of a base having a configuration generally similar to that of the finished cushioned bathtub. The base provides a desired degree of rigidity and strength for the tub. Referring to FIGS. 1 and 2, a base B is fabricated from a polyester resin and a reinforcing fiberglass fabric using a conventional FRP process. A female base mold 12 is used for making the base B. The base mold 12 is designed to sit upright upon a flat surface and includes a bottom 14, an upstanding wall 16 formed by opposed sidewalls and end walls, and a peripheral flange portion 18. To fabricate the bathtub base B, the exposed surface 20 of the base mold 12 is coated with a parting agent, such as that sold under the designation "Freekote 700" by Dexter Adhesives, Seabrook, N.H. A fiberglass mat is precut according to a predetermined pattern and is then laid into the base mold 12. Preferably, a single layer of about 2–2.5 ounces per square foot, continuous strand fiberglass mat (available from Owens-Corning) is placed on the side walls. Two plies of the fiberglass mat are used in high stress areas, such as the bottom and end walls.

To fabricate the base B, a FRP molding process is used. The base B can be formed from polyester resins that include additional components, such as fire retardants. Suitable resins for forming the base B are available from Reichold Chemicals, 50 Douglas Street, Port Moody, B.C. and are designated CC 154, with 40% fill of alumina trihydrated and 17–20% glass roving. The polyester resin and an appropriate catalyst, both in liquid form, are mixed in an appropriate apparatus and are sprayed onto the base mold 12. After about 20 minutes, the formed base B is removed from the base mold 12 and is allowed to stand for about 24 hours to completely cure. The final base B preferably has a thickness of about ¼–⅜inch.

The FRP process used in the invention has several advantages over the RTM process taught in the prior art, such as the Bortz patent. For example, the tooling required for typical RTM procedures is very expensive, with RTM molds costing on the order of about $25,000–$50,000. However, an FRP mold is considerably less expensive, typically on the order of about $5,000. Further, the injection molding process used in the prior art RTM procedure is a very time consuming and labor intensive step and generally requires the use of heating and cooling coils in the mold to maintain the mold at a desired temperature during formation.

The base B resulting from the present method has a smoothly finished, professionally looking exterior 22 resembling that of a more expensive RTM part. The interior 24 of the base B has a rough, sprayed up looking surface. However, this is not a disadvantage in the present invention, since, as will be described hereinbelow, the cushioning layers of the final article are formed on top of this rough surface 24, thus hiding the rough surface 24 from view. Additionally, the costs involved in forming the base B of the invention are much less than those of forming a standard RTM part since a two-part molding process is not required.

As shown in FIG. 2, the base B includes a substantially planar floor 28 of substantially rectangular configuration, a substantially planar front wall 30 and spaced-apart side walls 32 and 34, each upstanding from the floor 28. The base B further includes a sloping rear wall 36 upstanding from the floor 28 and integral with the side walls 32 and 34. A peripheral flange 38 extends from the upper edges of the front wall 30, side walls 32 and 34 and rear wall 36, with the portions of the peripheral flange 38 adjacent the side walls 32 and 34 and rear wall 36 having a peripheral rib 40.

After curing, flash on the edge of the peripheral flange 38 is trimmed off. A foam injection port 42 is drilled through the sloping rear wall 36 for injection of a self-foaming resin in an in situ foaming process, described hereinafter.

Figure 10:
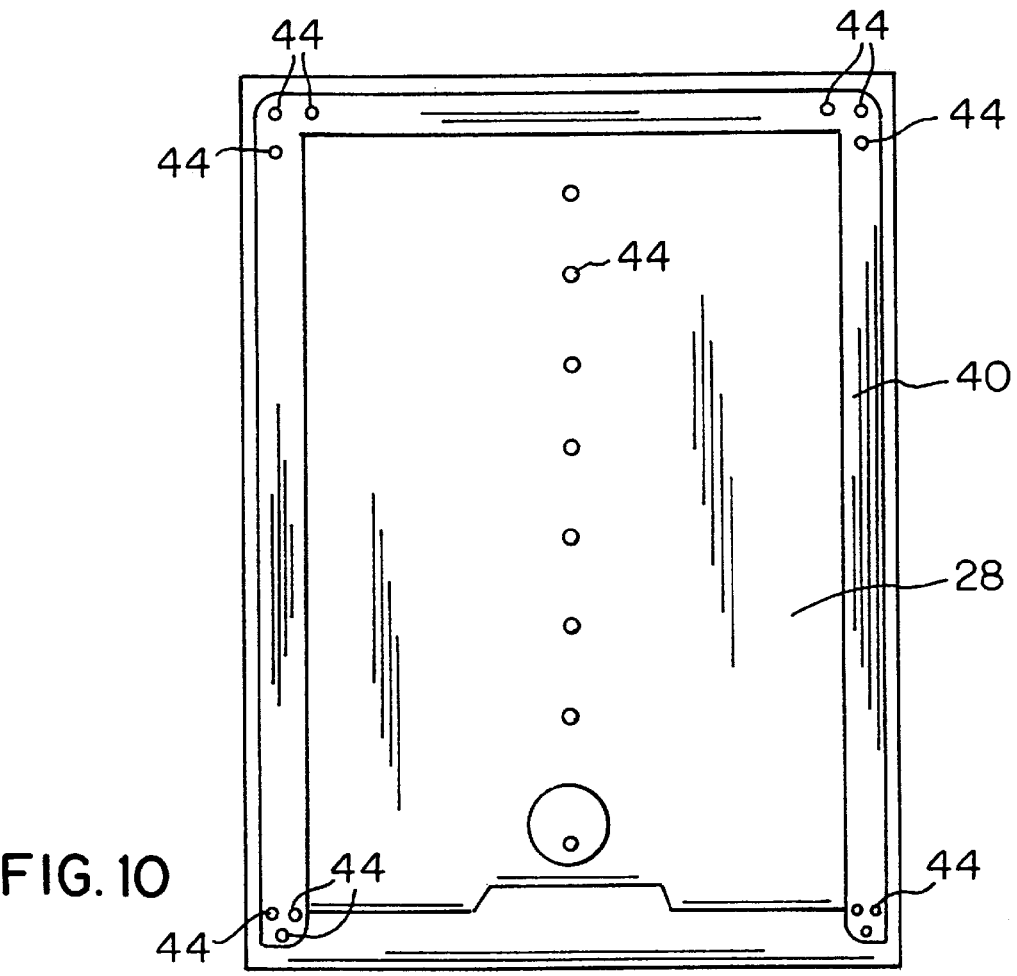
FIG. 10 is a plan view of the base shown in FIG. 2.

A plurality of vent apertures 44 are drilled through the floor 28, front wall 30, rear walls 36, sidewalls 32 and 34 and along the peripheral rib 40. The preferred location of the vent apertures 44 is shown in FIGS. 2 and 10 of the drawings. Three apertures 44 are drilled in each corner of the peripheral rib 40, with the apertures 44 located approximately ½ inch from the outer edge of the peripheral rib 40 and with the apertures 44 being about ½ inch apart. Nine apertures 44 are drilled in the midradius of the floor 28 along the length of the base B. The midradius apertures 44 are approximately 5½ inches apart with the first midradius aperture 44 located about 1 inch from midradius from the front wall 30. An 11 by 7 aperture pattern is drilled into the front wall 30 with the apertures 44 spaced about 2.5–3 inches apart. A similar 11 by 7 pattern is drilled in the rear wall 36. A plurality of apertures 44 is also drilled into the upper portion of each side wall 32 and 34, with the apertures 44 being about 3 inches apart. Each of the vent apertures 44 is preferably about 1 mm, i.e., about ¹⁄₂₀ inch, in diameter.

Figure 3:
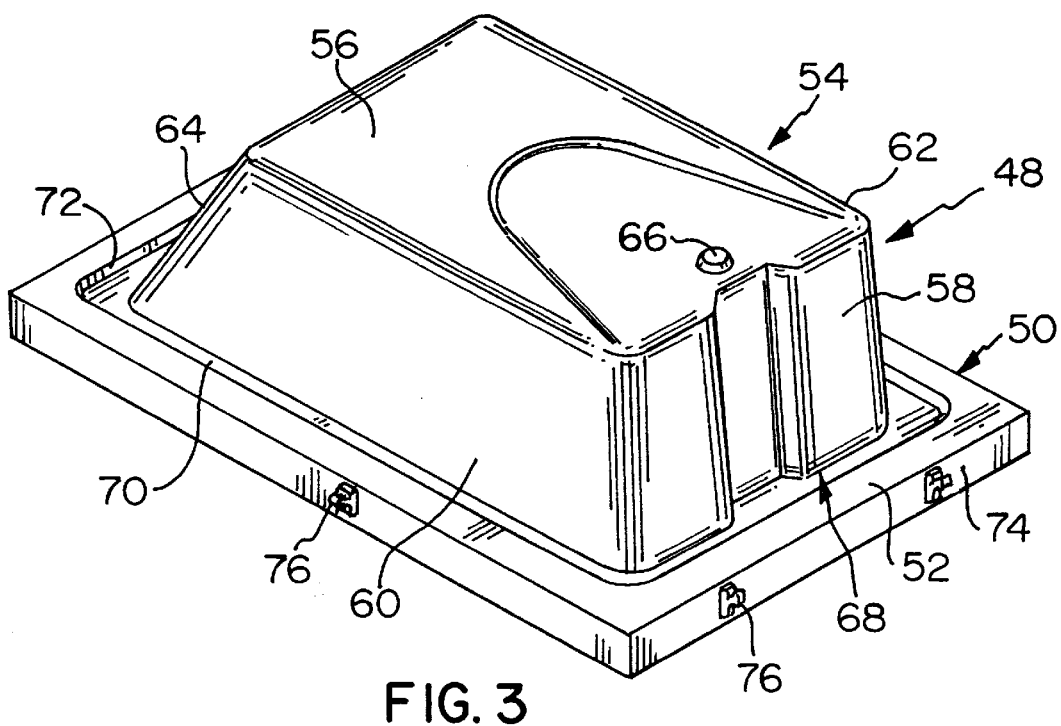
FIG. 3 is an elevational view of a form for fabricating a composite, flexible skin.

Referring to FIG. 3, a composite, flexible polymeric skin S is formed on the surface of a form 48. The form 48 includes a base portion 50 having a substantially planar, peripheral surface 52. A member 54 having a configuration equivalent to that of the desired inner surface of the bathtub projects from the base portion 50 and includes a floor surface 56 generally complementary to the floor 28 of the base B, a front wall surface 58 generally complementary to the front wall 30 of the base B, a pair of side wall surfaces 60 and 62 generally complementary to the side walls 32 and 34 of the base B and a sloping rear wall surface 64 generally complementary to the rear wall 36 of the base B. Protruding from the floor surface 56 is a projection 66 that is positioned at the desired location of a drain for the bathtub. As seen in FIG. 3, a recess 68 is provided in the base portion 50 surrounding the member 54, wherein the arms of the bathtub are cast. The recess 68 includes a bottom floor portion 70 and an outer upright wall portion 72 located intermediate between the bottom floor portion 70 and the peripheral surface 52. The base portion 50 includes an upright wall portion 74 extending in a direction opposite the member 54 from the peripheral edge of the peripheral surface 52. Positioned at a plurality of locations on the upright wall portion 74 are hooks 76 for securing the form 48 to a frame, as described below in more detail.

Preparatory to fabrication of the composite, flexible polymeric skin S, the peripheral surface 52 and all exposed surfaces of the member 54 and the recess 68 are first cleaned with a clean cloth and a solvent, such as methylethylketone. This cleaning should remove all contaminants and all residual process materials. After the surfaces are cleaned, it is preferred that they be shined to a high gloss using a wax, such as "Partall No. 2" available from Rexco Chemical Corp., Carpenteria, Calif. It is also preferred that prior to waxing, the surfaces of the form 48 be preheated to a temperature of about 75°±10° F. The resulting waxed surfaces should have a uniform high gloss with no streaks or marks visible. The surfaces should be cleaned after each use and waxed at least during every other cycle.

After the surfaces have been cleaned, waxed and heated, a mold release agent, such as polyvinyl alcohol, available commercially under the trade name "Partall PVA No. 10" from Rexco Chemical Corp. is applied by first spraying on a thin dust coat and then applying a second wet coat. The resulting coating should be shiny and bubble-free.

Figure 4:
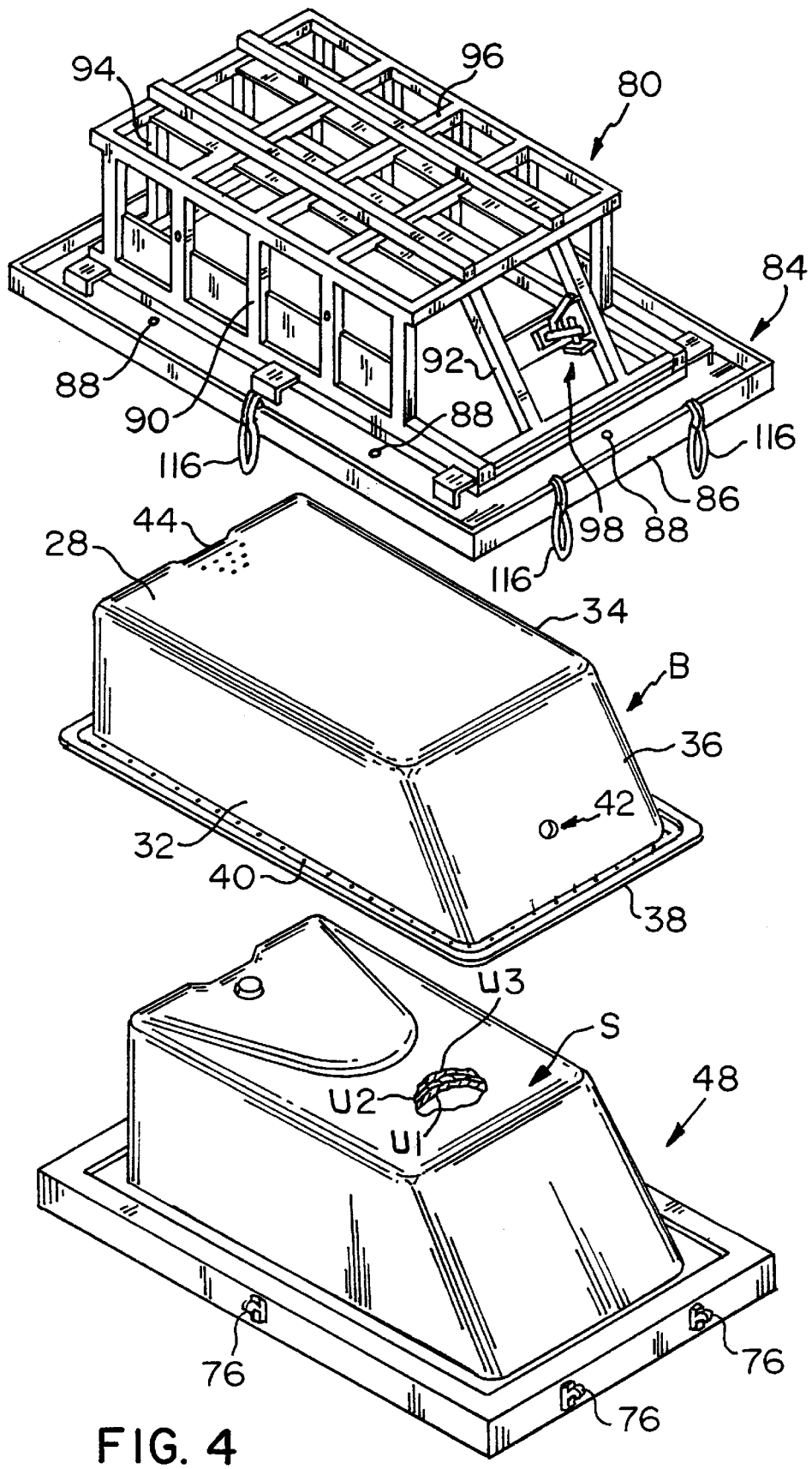
FIG. 4 is an exploded, elevational view showing assembly of the form with the base and a frame.

Referring to FIG. 4, the composite polymeric skin S is formed in the following manner. In the first step, a first coating U1 of an elastomeric, urethane resin is formed on the exposed surfaces of the form 48 by spraying a carrier solvent free urethane resin mixture onto the form 48. The urethane resin mixture can be applied using a conventional spraying apparatus. Such solvent free resins are termed as "100% solids" resins since they do not include any volatile carrier solvents. Suitable resins are available from Futura Coatings, Ltd., 9200 Latty Avenue, Hazelwood, Mo. and are designated as EC16741A and B. These resins are mixed in a 1:1 ratio to form the resin mixture used to form the first coating U1. A colorant, such as a conventional, commercially available pigment, is preferably added to the resin mixture to form a desired color for the surface of the tub. The resulting resins and colorant mixture preferably has less than 50 weight percent colorant. This first coating U1 preferably has a thickness of about 3–5 mils.

Prior to application of the first coating U1, the form 48 is conditioned by wetting the entire exposed surface with a solvent, such as methylethylketone. Prior to the application of the elastomeric resins of the first coating U1, the surfaces of the form 48 should be allowed to completely dry and there should be no drip spots. Preferably, the first coating U1 is applied in three successive coating layers. The first coating layer is applied to the exposed surface of the form 48 and allowed to set for about 10 minutes. A second coating layer is then applied on top of the first layer and allowed to set for about 15 minutes. A third coating layer is applied on top of the second coating layer and is allowed to set for about 45–60 minutes. The first, second and third coating layers form the first coating U1.

With the prior art vinyl or urethane carrier solvent systems, coatings would have to be cured to volatilize the carrier solvent. The volatilized solvent forms gas bubbles which move through the hardening layer. Therefore, if the surface of the coating layer hardens before the gas bubbles have a chance to escape, the trapped bubbles form weak spots in the coating layer. These weak spots cause the surface of the layer to collapse to form pock marks. Additionally, such prior art vinyl or urethane skins had a tendency to shrink during curing, pulling the curing coating layer off of the form, especially in corner areas. The use of 100% solids resins greatly diminishes the risk of cosmetic defects in the first coating U1 and, hence, in the finished tub.

In the second step, a second coating U2 is formed on the first coating U1 by spraying onto the first coating U1 a second 100% solids resins mixture. The resins used for the second coating U2 are available from Futura Coatings, Ltd. and are designated as EC16715A and B. These resins are mixed in a 2:1 ratio and are applied to form a second coating U2 having a thickness of about 60–70 mils onto the first coating U1. The second coating U2 is the predominant material in the composite polymeric skin S and imparts thickness and strength to the skin S. Preferably, the second coating U2 is formed by three sprayed on layers of 100% solids resins with no dwell time between application of the layers. The second coating U2 is allowed to set for about 1 hour. The thickness of the second coating U2 can be varied to add stiffness and strength to different areas of the fabricated article.

A third coating U3 is then applied to the second coating U2. The third coating U3 comprises a foamable resin, preferably a foamable urethane. The third coating U3 is formed on the surface of the second coating U2 in conventional manner, such as spraying. The third coating U3 does not contribute greatly to the strength of the composite skin S but rather adds a soft feel to the composite skin S. While the composite skin S can be used without the third coating U3, where a soft feel is desired, it is preferred to apply the third coating U3. Resins suitable for the third coating are available from Chemstar Urethanes, Inc., 1148 California Avenue, Corona, Calif. and are designated as Hydro-flex, gray. The third coating U3 has a preferred thickness of about ⅛ to ¼ inch. Suitable thicknesses can be achieved by applying the foamable urethane mixture to the second coating U2 using a spray gun. The form 48 temperature should preferably be at least about 85° F. and not more than about 120° F. during formation of the third coating U3. The temperature of the foamable urethane mixture upon exit of the spray gun should not exceed about 140° F. to about 160° F. The third coating U3 should be applied as smoothly as possible without runs. The surface temperature of the foam skin should be about 85°–95° F. when taken along the peripheral surface portion 52 of the form 48.

Before further processing, the applied foam should be allowed to become integral, which can take approximately 5 minutes. Longer foaming times may be required to achieve the required skin temperature. Typically, foaming polyurethane resins generate and maintain heat when they foam. Accordingly, a measurement of the skin temperature is an indication of the completeness of foaming. The resulting foamed layer should be of uniform thickness, except on the areas of the form 48 where the tub plumbing will be located, where a thinner skin layer is desired. The third coating U3 should be free of drips that would be visible on the finished part. When applied, the finished foam should cover the entire surface of the form 48 with a foam layer approximately ¼ inch thick at the maximum. No areas of the surface of the second coating U2 should be void of a foam layer, except in the plumbing area discussed above, which is deliberately "skinned" rather than foamed. The purpose of the foamable polyurethane third coating U3 is to form a firmer polymeric skin S by adding body to the underlying first and second coatings U1 and U2.

When the foamable resin coat is applied to the plumbing wall, it is purposefully made thinner than the thickness of the other portions of the third coating U3 in order to ensure that space is provided for the foamable resin step described below in more detail.

Although the foamable urethane third coating U3 is formed from a self-foaming polyurethane resin, when sprayed on in a thin layer, the resin does not generate and maintain sufficient heat to induce substantial foaming. Consequently, a thin layer of a foamable polyurethane resin cures to form a flexible polymeric layer that has numerous micropores that are readily visible under low magnification. The term "skin foam" (also commonly referred to as an "integral skin foam") refers to a foaming resin that forms an integral adherent skin against surfaces with which the resin is in contact during curing. Such resins include a surfactant that causes resin to wet the surface and cause the skin to form against the surface as the resin foams and cures.

Polyurethanes are preferred because they set up relatively quickly compared to other resins, such as vinyl resins. The shorter curing times result in a shorter process time which leads to a more economical manufacturing process. The polyurethanes cure in a matter of minutes, which is particularly advantageous when manufacturing on a commercial scale. The elastomeric urethane polymers are also preferred to other polymers, such as vinyl polymers, because of their enhanced physical properties such as tensile strength, elongation and abrasion resistance, which makes them more suitable to withstand the rigors of actual use than other polymers such as vinyl polymers. In addition, urethane polymers do not lose plasticizer and become brittle over time, as has been observed with the vinyl polymers of the prior art.

Figure 5:
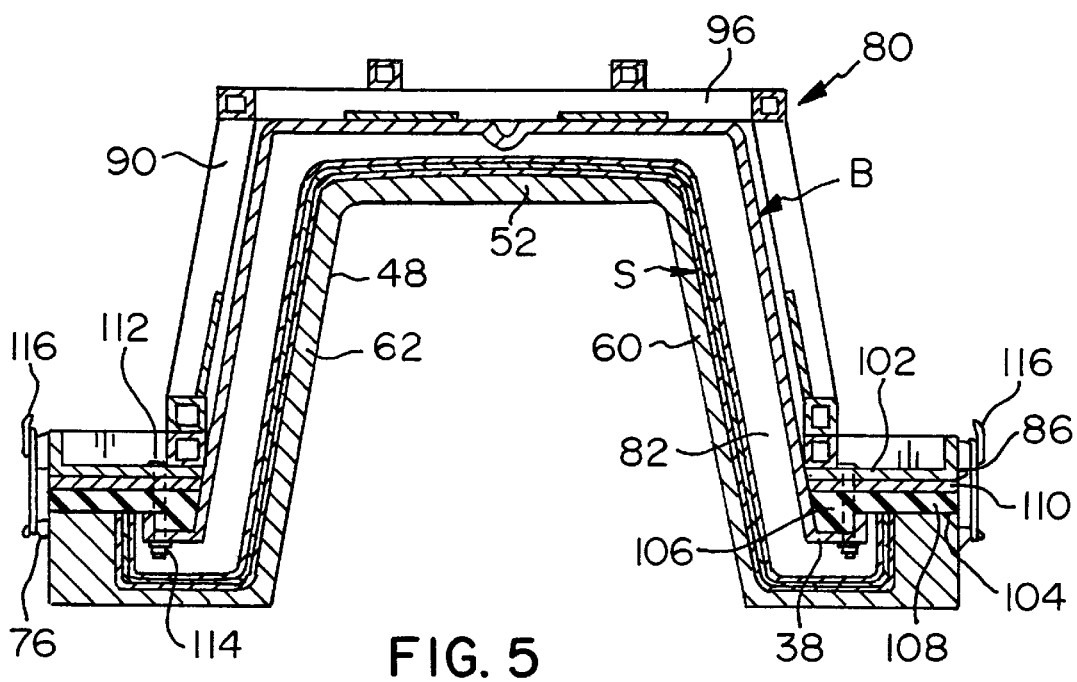
FIG. 5 is a cross-sectional view of the assembled assembly shown in FIG. 4.

With reference to FIGS. 4 and 5, in the next step of the fabrication process, the base B is inverted, secured to a frame 80 and placed over and secured to the form 48. This results in a cavity 82 formed between the base B and the form 48. A conventional self-foaming polyurethane resin may be injected and allowed to expand and cure to create a cellular foam in the cavity 82.

The frame 80 comprises a steel framework, the interior dimensions of which generally conform with the exterior dimensions of the base B. The frame 80 has a generally rectangular frame base 84 having a lower surface 86 generally complementary to the peripheral surface 52 of the form 48 and the flange 38 of the base B. The lower surface 86 is sealed to the planar peripheral surface 52 of the form 48 and the peripheral flange 38 of the base B, as described below in further detail. Spaced around the periphery of the frame base 84 is a plurality of holes 88 passing through the lower surface 86. The frame 80 further includes upright frame members 90 complementary with the side walls 32 and 34 of the base B, angled frame members 92 complementary with the rear wall 36 of the base B and upright end members 94 complementary with the front wall 30 of the base B. Additionally, a rectangular array of cross-top frame members 96 are positioned adjacent the floor 28 of the base B when the frame 80 is assembled with the base B. A manually operated closure device 98 is mounted between the angled frame members 92 for sealing the port 42 upon completion of the foam injection process described below.

Referring to FIG. 5, the base B is assembled with the frame 80 by inverting the base B as shown in FIG. 4, and lowering the frame 80 over the base B until the lower surface 86 of the rectangular frame base 84 is sealed to the underside of the peripheral flange 38. The lower surface 86 of the rectangular frame base 84 is defined by a planar metal gasket 102 that cooperates with an integral silicone rubber seal 104 to seal the rectangular frame base 84 to the underside of the peripheral flange 38 and the planar peripheral surface 52 of the form 48. The integral silicone rubber seal 104 has a body portion 106 that is shaped to be complementary with the channel in the underside of the flange 38. The body portion 106 of the integral silicone rubber seal 104 extends around the periphery of the base B within the channel in the peripheral flange 38. The integral silicone rubber seal 104 also includes a peripheral flange 108 that extends outwardly from the body portion 106 so as to extend the seal between the peripheral surface 52 and the metal gasket 102. Before, the frame 80 is lowered over the base B, the integral silicone rubber seal 104 is positioned within the channel and the underside of the flange 38 and around the base B. Overlying the integral silicone rubber seal 104 is a planar mounting plate 110 that covers the entire exposed upper surface of integral silicone rubber seal 104 and separates it from the metal gasket 102. With the integral silicone rubber seal 104, metal gasket 102 and mounting plate 110 in place, the frame 80 is lowered over the base B until the metal gasket 102 engages the upper surface of the mounting plate 110. In this manner, the base B is sealed to the frame 80 to prevent leakage of foam during the in situ foaming step described below. The base B is held firmly in place against the frame 80 by screws 112 located through the holes 88 in the frame 80 and holes (not shown) in the metal gasket 102, body portion 106 of the silicone rubber seal 104 and the base B. The screws 112 are secured by speed nuts 114.

The assembled base B and frame 80 are then lowered onto the form 48, with the member 54 projecting into the interior of the base B, until the underside of the integral silicone rubber seal 104 conformably abuts the planar peripheral surface 52. As the underside of the rubber seal 104 abuts the peripheral surface 52, the frame 80 is sealed to the base portion 50 of the form 48 and thereby prevents leakage of foam resin from the cavity 82 during the in situ foaming step described hereinbelow. The base portion 50 of the form 48 and the frame 80 are then secured together using the hooks 76 on the form 48 and clamps 116 provided on the frame 80. At this point, it will be noted (see FIG. 5) that the base B is separated from the composite polymeric skin S to define the cavity 82 therebetween.

Figure 6:
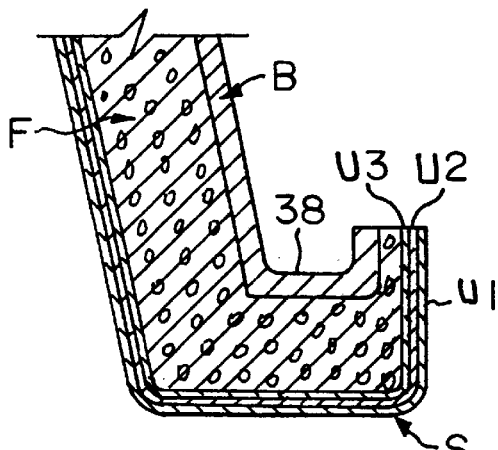
FIG. 6 is a cross-sectional view showing the laminate components of the composite skin along the arms of the article.

Referring additionally to FIG. 6, the cavity 82 is then filled with a flexible cellular foam F by an in situ foaming process. Preferably, the cellular foam F comprises a flexible polyurethane foam material which is environmentally friendly. Such a foam is available from IPI, 505 Blue Ball Road, Elkton, Md. and is designated IPI 1442 A and W. For the present invention, these components are preferably mixed in a 1:2 ratio. The foam F preferably has a density of about 3.5 to about 5 pounds. It is preferred that a 1 inch foam core be provided. Therefore, the spacing between the base B and the composite polymeric skin S should be approximately 1 inch. The urethane foam resin mixture is injected under force in liquid form through the port 42, with the foam F thereafter expanding as is conventional throughout the cavity 82 and with the trapped air escaping through the vent apertures 44. The port 42 is closed with the closure device 98 after injection of the liquid to contain the expanding foam. During expansion and subsequent curing, the foam F bonds to the surface of the base B and to the surface of the foamable polyurethane third coating U3 of the skin S. Preferably, the surface of the foamable urethane third coating U3 is about 70°–80° F. and the temperature of the base B is between about 70°–80° F. during this foaming process.

The temperature of the foamable polyurethane should be in accordance with the manufacturers' specifications. After injection of the foamable polyurethane, sufficient time should be provided for completion of the curing period. Generally, waiting periods of about 20 minutes are suitable for the resins described above. The resulting foamed layer should be free of voids and should bond securely to the fiberglass shell and the polymeric skin. The integral silicone rubber seal 104 should prevent foam leaks.

While specific polyurethane foam materials have been described above, it is to be understood that other open and close cell foams may also be employed.

The amount of foam F used as well as the output rate of the dispensing unit are critical to obtaining a final product having optimum texture and strength. In practice, an overpack of about 30% to 40% achieves superior results, with 35% being preferable. By overpack, it is meant that more foam by weight is injected into the cavity 82 than would be required to just fill the cavity 82 with foam upon complete curing. If an insufficient overpack of foam is used, there is a likelihood that the foam F will not be distributed evenly throughout the cavity 82, resulting in large void spaces within the cavity 82. If too much foam is used, the cured foam F often displays shrinkage, with consequent deformation of the resulting bathtub surfaces. After curing (about 20 minutes), the clamps 116 are released and the assembled bathtub, comprising the base B, the composite skin S and the foam F sandwiched therebetween, together with the frame 80, is removed from the form 48, with the skin S separating from the surfaces of the recess 68, member 54 and peripheral surface 52 of the form 48. Thereafter, the screws 112 are removed and the frame 80 is separated from the bathtub. In order to facilitate the release of the form 48, compressed air can be injected into the mold until separation is accomplished. The resulting bathtub should then be washed with water to remove any polyvinyl alcohol present.

Figure 7:
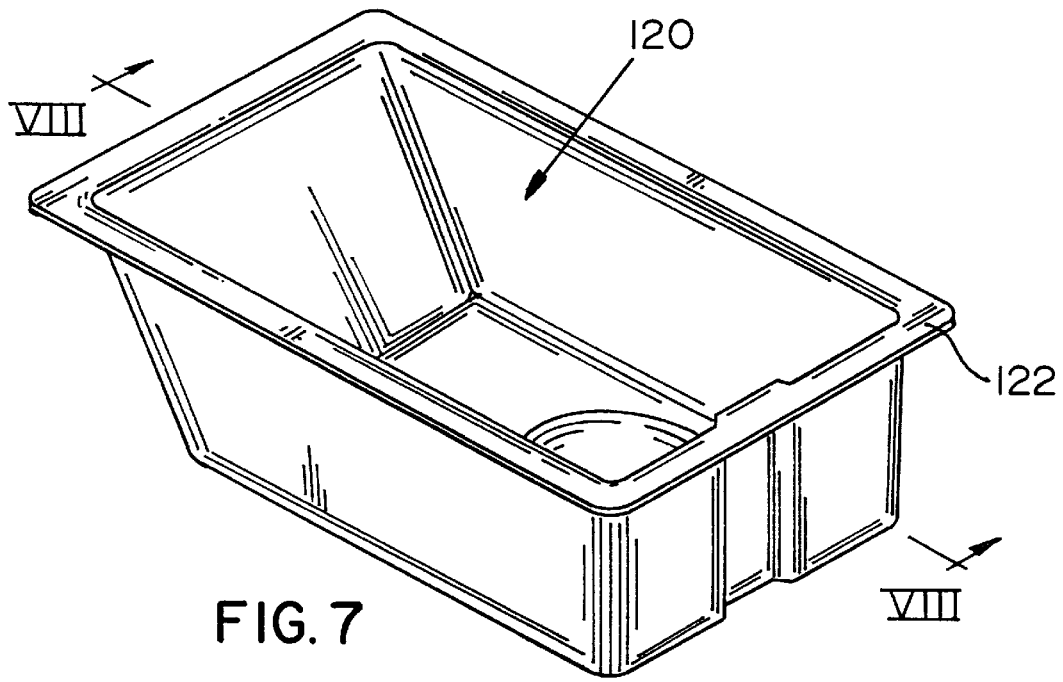
FIG. 7 is an elevational view of a fabricated cushioned article in the form of a tub.
Figure 8:
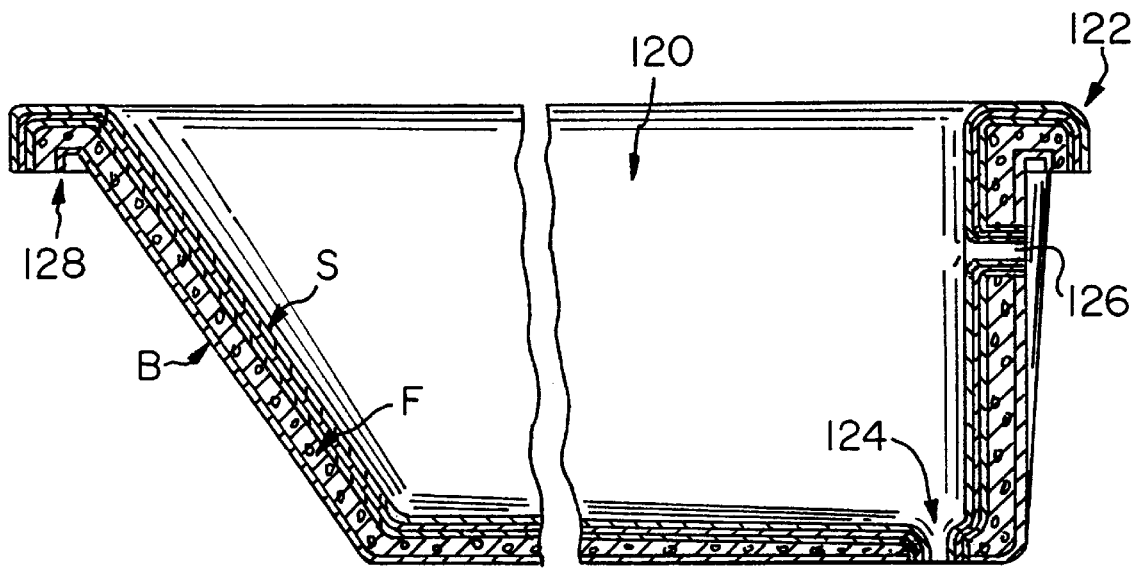
FIG. 8 is a cross-sectional view of the fabricated cushioned article taken along the line VIII—VIII in FIG. 7.

The finished bathtub is shown in FIGS. 7 and 8 and comprises a center receptacle portion 120 and an outer, laminated peripheral arm flange 122, the upper surfaces of which are covered by the composite skin S and the lower surfaces of which, in large part, are formed by the base B, with the foam F being sandwiched therebetween at substantially all points. It will be noted that the projection 66 on the member 54 (FIG. 3) has resulted in an opening 124 in the bottom of the bathtub, which opening 124 is closed by the skin S and base B, both of which must be removed by drilling or otherwise to form a drain for the bathtub. An overflow outlet 126 is formed on the front wall of the bathtub in a similar manner.

The bathtub may be installed as is by lowering the bathtub into a suitable framework, whereupon the bathtub either rests on the floor or is supported by the arm flange 122, or both. Alternatively, the bathtub may be freestanding, merely resting on the floor with its exposed sides being covered by appropriate facia (not illustrated) one end of which can be inserted into a recess 128 provided by the underside of the rib 40 of the base B in the lower surface of the arm flange 122. Alternatively, the bathtub may be inserted into an enclosure formed by one to three walls, with a framework depending from those walls and supporting the arm flange 122 and with the exposed side of the sides of the bathtub being covered by appropriate facia.

Figure 9:
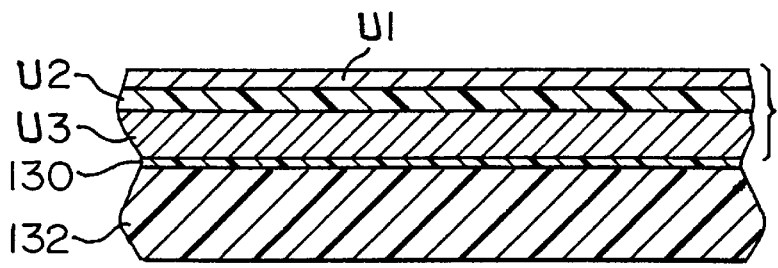
FIG. 9 is a cross-sectional view of an alternative embodiment of a cushioned article for containing fluid formed in accordance with the present invention.

An alternative embodiment of the invention is shown in FIG. 9 in the form of a receptacle for fluid. The receptacle is formed in accordance with the present invention and includes a polymeric skin having first and second coatings U1 and U2, as described above, with a third coating U3 comprising a foamable polymeric resin that is approximately 1 to 1½ inches thick. The third coating U3 is coated with a binder coat 130 that promotes binding of the resin of the third coating U3 to a fiberglass layer 132 that is applied over the binder coat 130. In accordance with this embodiment, the first, second and third coatings U1, U2 and U3 are provided on a form similar to the form 48 described above. The foamable polymeric resin of the third coating U3 is generally made thicker in this embodiment than in the embodiment described above. Such thickness can be achieved by applying multiple layers of polymeric resin in the manner similar to forming the third coating U3 described above. The binder coat 130 is preferably a urethane polyester mixture, such as available from Polymer Development Laboratory, Orange, Calif. and designated M5 hybrid. The binder coat 130 can be applied by rolling or brushing and is generally applied to a thickness of about 5 to 10 mils. After the binder coat 130 is applied, a layer of fiberglass 132 can be applied by conventional techniques that involve spraying. Preferably, the fiberglass layer 132 is applied to a thickness of about ¼ to 5/16 inch. After the fiberglass cures, the entire lay-up can be removed from the form to provide a receptacle for fluid in accordance with the present invention.

It will readily be appreciated by those skilled in the art that modifications may be made to the invention without departing from the concepts disclosed in the foregoing description. Such modifications are to be considered as included within the following claims unless the claims, by their language, expressly state otherwise. Accordingly, the particular embodiments described in detail hereinabove are illustrative only and are not limiting as to the scope of the invention which is to be given the full breadth of the appended claims and any and all equivalents thereof.

I claim:

1. A method of making a cushioned article, comprising the steps of:
    forming a base in a female base mold having an interior;
    forming a flexible skin by applying at least one carrier solvent free material to a form;
    assembling the base and flexible skin such that a cavity is formed therebetween; and
    injecting a foam material into the cavity such that when the foam material cures, the foam material binds the base with the flexible skin to form the article, wherein the flexible skin forming step includes:
        applying a first carrier solvent free resin mixture on top of the form to form a first coating;
        applying a second carrier solvent free resin mixture on top of the first coating to form a second coating; and
        applying a foamable resin mixture on top of the second coating to form a third coating.

2. A method of making a cushioned article, comprising the steps of:
    applying a first carrier solvent free resin mixture onto a form to form a first coating;
    applying a second carrier solvent free resin mixture onto the first coating to form a second coating;
    applying a foamable polymeric resin onto the second coating to form a third coating;
    applying a binder coating onto the third coating; and
    applying a fiberglass coating onto the binder coating.

3. A method of making a cushioned article, comprising the steps of:
    forming a base in a female base mold having an interior, the base having a substantially smooth exterior surface and a substantially rough interior surface;

forming a flexible skin by applying at least one carrier solvent free material to a form;

assembling the base and flexible skin such that a cavity is formed therebetween; and injecting a foam material into the cavity such that when the foam material cures, the foam material binds the base with the flexible skin to form the article, wherein the flexible skin forming step includes:

applying a first carrier solvent free resin mixture onto the form to form a first coating;

applying a second carrier solvent free resin mixture onto the first coating to form a second coating; and applying a foamable resin mixture onto the second coating to form a third coating.

4. The method as claimed in claim 3, including forming the first coating to have a thickness of about 3–5 mils.

5. The method as claimed in claim 3, including forming the second coating to have a thickness of about 60–70 mils.

6. The method as claimed in claim 3, including forming the third coating to have a thickness of about 1/8–1/4 inch.

7. The method as claimed in claim 3, including adding a colorant to the first coating.

8. A method of making a cushioned article, comprising the steps of:

forming a base in a female base mold having an interior, the base having a substantially smooth exterior surface and a substantially rough interior surface;

forming a flexible skin by applying at least one carrier solvent free material to a form;

assembling the base and flexible skin such that a cavity is formed therebetween;

injecting a flexible foam material into the cavity such that when the flexible foam material cures, the flexible foam material binds the base with the flexible skin to form the cushioned article; and forming a plurality of vent apertures in the base, wherein the base includes a floor, front wall, rear wall and a pair of opposed side walls with a peripheral flange extending around an upper part of the base and with a peripheral rib located on the peripheral flange adjacent the side walls and rear wall, the method including:

placing three vent apertures at each corner of the peripheral rib, with the vent apertures in the peripheral rib located about 1/2 inch from an outer edge of the rib;

placing nine vent apertures alone a midradius of the base floor, with the floor apertures located about 5½ inches apart;

forming an aperture pattern in the front and rear walls, the aperture pattern having seven rows of apertures with each row having eleven spaced apertures, with the front and rear wall apertures located about 2.5–3 inches apart; and forming a plurality of apertures in an upper portion of each side wall, with the side wall apertures located about 3 inches apart.

9. The method as claimed in claim 8, wherein the base is formed by placing at least one fiberglass mat in the base mold and applying a polyester resin material to the interior of the base mold.

10. The method as claimed in claim 9, including applying the polyester resin material such that the base has a thickness of about 1/4–3/8 inch.

11. The method as claimed in claim 8, including forming the vent apertures to have a diameter of about 1 mm.

12. A method of making a cushioned article comprising the steps of:

providing a female base mold having an interior;

applying a parting agent to the interior of the female base mold;

placing at least one fiberglass mat into the base mold;

applying a polyester resin material to the interior of the base mold to form a base having a substantially smooth outer surface, a substantially rough inner surface, a front wall, a rear wall and a pair of opposed side walls;

forming a plurality of vent apertures in the base;

providing a skin forming form having a surface;

forming a first coating on the surface of the form by applying a first carrier solvent free resin mixture onto the form surface;

forming a second coating on the first coating by applying a second carrier solvent free resin mixture onto the first coating;

forming a third coating of a foamable resin on the second coating, the first, second and third coatings forming a flexible skin;

positioning the base and the skin such that the interior of the base is spaced from the third coating to form a cavity therebetween; and injecting a cellular foam into the cavity to bind the base to the skin to form the cushioned article.

13. The method as claimed in claim 12, including applying a polyester resin material to the base mold to form the base having a thickness of about 1/4–3/8 inch.

14. The method as claimed in claim 12, wherein the base includes a floor, front wall, rear wall and a pair of opposed side walls with a peripheral flange extending around an upper part of the base with a peripheral rib located on the peripheral flange adjacent the side walls and rear wall, the method including:

placing three vent apertures at each corner of the peripheral rib, with the vent apertures in the peripheral rib located about 1/2 inch from an outer edge of the rib;

placing nine vent apertures along a midradius of the base floor, with the floor apertures located about 5½ inches apart;

forming an aperture pattern in the front and rear walls, the aperture pattern having seven rows of apertures with each row having eleven spaced apertures, with the front and rear wall apertures located about 2.5–3 inches apart; and forming a plurality of apertures in an upper portion of each side wall, with the side wall apertures about 3 inches apart.

15. The method as claimed in claim 12, including forming the vent apertures to have a diameter of about 1 mm.

16. The method as claimed in claim 12, including forming the first coating by applying three successive coating layers of a carrier solvent free urethane resin mixture on the form.

17. The method as claimed in claim 12, including forming the first coating to have a thickness of about 3–5 mils.

18. The method as claimed in claim 12, including forming the second coating to have a thickness of about 60–70 mils.

19. The method as claimed in claim 12, including forming the third coating to have a thickness of about 1/8–1/4 inch.

* * * * *